(12) United States Patent
Bourne et al.

(10) Patent No.: US 6,176,336 B1
(45) Date of Patent: Jan. 23, 2001

(54) VEHICLE STEERING CONTROL

(75) Inventors: Carl Charles Bourne, Chaddesden; Paul Thomas Faithful, Leamington Spa, both of (GB)

(73) Assignee: Rover Group Limited, Warwick (GB)

( * ) Notice: Under 35 U.S.C. 154(b), the term of this patent shall be extended for 0 days.

(21) Appl. No.: 09/086,187

(22) Filed: May 28, 1998

(30) Foreign Application Priority Data

May 31, 1997 (GB) .................................................. 9711170

(51) Int. Cl.⁷ .......................... B60K 17/356; G05D 17/00
(52) U.S. Cl. ............................. 180/197; 180/244; 701/82
(58) Field of Search .................................. 180/243, 197, 180/244; 701/82, 83, 84, 90, 80

(56) References Cited

U.S. PATENT DOCUMENTS

| 4,236,595 | | 12/1980 | Beck et al. ............................ 180/243 |
| 4,571,010 | * | 2/1986 | Dittner et al. ........................ 303/110 |
| 4,886,142 | | 12/1989 | Yamaoka et al. ..................... 180/242 |
| 4,967,868 | | 11/1990 | Schwarz et al. ...................... 180/233 |
| 5,147,010 | | 9/1992 | Olson et al. .......................... 180/197 |
| 5,224,766 | | 7/1993 | Oikawa et al. ....................... 303/100 |
| 5,407,023 | * | 4/1995 | Yamashita et al. ................... 180/197 |
| 5,469,359 | * | 11/1995 | Tsuyama et al. ................ 364/426.03 |
| 5,629,850 | * | 5/1997 | Okawa ........................... 364/426.016 |
| 5,749,062 | * | 5/1998 | Yamamoto et al. .................... 701/72 |
| 5,839,535 | * | 11/1998 | Arai ...................................... 180/197 |
| 5,850,616 | * | 12/1998 | Matsuno et al. ....................... 701/82 |
| 5,884,719 | * | 3/1999 | Schramm et al. ..................... 180/197 |
| 5,961,565 | * | 10/1999 | Kawabe et al. ........................ 701/90 |
| 5,971,089 | * | 10/1999 | Sawada ................................ 180/197 |

FOREIGN PATENT DOCUMENTS 0 473 112 A2   3/1992   (EP) .
2 291 148      1/1996   (GB) .

OTHER PUBLICATIONS

Japanese Abstract, vol. 95, No. 9 dated Oct. 31, 1995 & JP 07 156676 A (Suzuki) dated Jun. 20, 1995.

* cited by examiner

*Primary Examiner*—Brian L. Johnson
*Assistant Examiner*—Christopher Bottorff
(74) *Attorney, Agent, or Firm*—Davis and Bujold

(57) ABSTRACT

A drive system for a vehicle having steerable front wheels comprises wheel speed sensors for the front wheels, drive motors for driving the front wheels, and a control unit arranged to receive signals from the sensors, to determine from the signals received by the control unit the speed of the front wheels and the ground speed of the vehicle, and to control the drive motors to increase the drive to the front wheels if the speed of the wheels is less than a desired wheel speed for the determined ground speed, indicating that the steerable wheels are slipping.

15 Claims, 3 Drawing Sheets

VEHICLE STEERING CONTROL

FIELD OF THE INVENTION

The present invention relates to steering and traction control systems for vehicles.

BACKGROUND OF THE INVENTION

In a conventional vehicle having two or more pairs of wheels, one or more pairs of which are steerable, it is often easy for a driver to lose control due to sliding of the wheels when descending a steep slope or travelling on a slippery, low friction surface such as ice. One of the reasons for this is that when the front wheels start to slide the driver loses control of the steering. Inexperienced drivers tend to exacerbate the problem in such conditions by applying the brakes to try to control the speed of the vehicle. This simply increases slipping and further reduces steering control.

The present invention aims to overcome this problem by providing an automatic system for improving steering control.

SUMMARY OF THE INVENTION

Accordingly the present invention provides a drive system for a vehicle having a steerable wheel, the system comprising wheel slip measuring means for measuring the slip rate of said steerable wheel, drive means for driving said steerable wheel, and control means arranged to receive signals from said wheel slip measuring means, and to control the drive means to increase the driving torque to the steerable wheel if the negative slip rate of the steerable wheel is greater than a desired negative slip rate.

The present invention further provides a drive system for a vehicle having a steerable wheel, steering angle measuring means for measuring the steering angle of said steerable wheel, wheel slip measuring means for measuring the slip rate of said steerable wheel, torque demand means indicating a demand for torque from a driver of the vehicle, and torque control means arranged to monitor the slip rate measured by the measuring means and to control the torque supplied to said steerable wheel thereby to control said slip rate to a desired slip rate, wherein the desired slip rate is dependent on the torque demand and the steering angle.

In most cases the vehicle will have a pair of steerable wheels, usually the front pair. In such cases the drive means preferably enables the driving torque to each of the steerable wheels to be controlled independently. For example the drive means may comprise an electric motor for each steerable wheel, or a viscous coupling for each steerable wheel which can be controlled to vary the torque transmitted to each steerable wheel. However it will be appreciated that the measured slip rate and the desired slip rate could be based on an average between the two steerable wheels and in that case the drive means could be arranged to control the torque to the front pair of wheels, for example the torque supplied to a front differential.

The torque demand means will generally comprise an accelerator pedal for demanding a driving torque and a brake pedal for demanding a braking torque.

Preferred embodiments of the present invention will now be described by way of example only with reference to the accompanying drawings.

DESCRIPTION OF PREFERRED EMBODIMENTS OF THE INVENTION

Figure 1:
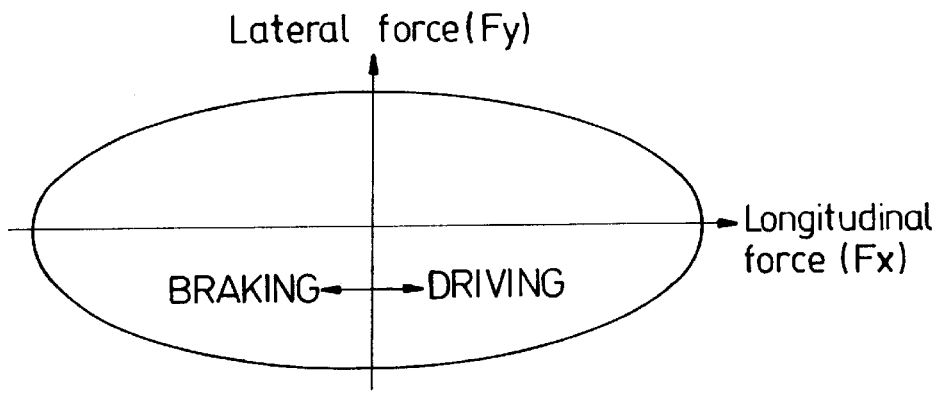
FIG. 1 is a diagram showing the relationship between the maximum longitudinal and lateral forces which a tire can provide before slipping.

Referring to FIG. 1, the maximum amount of cornering (lateral) force which a vehicle wheel can produce before it starts to slip varies with the tractive or braking (longitudinal) force it is producing. This relationship can be represented as an ellipse as in FIG. 1, and the basic effect is that, as the longitudinal force increases, the maximum lateral force available decreases. This effect is described by J Y Wong 'Theory of Ground Vehicles' 2nd Edition, Wiley and sons, 1993.

Figure 2:
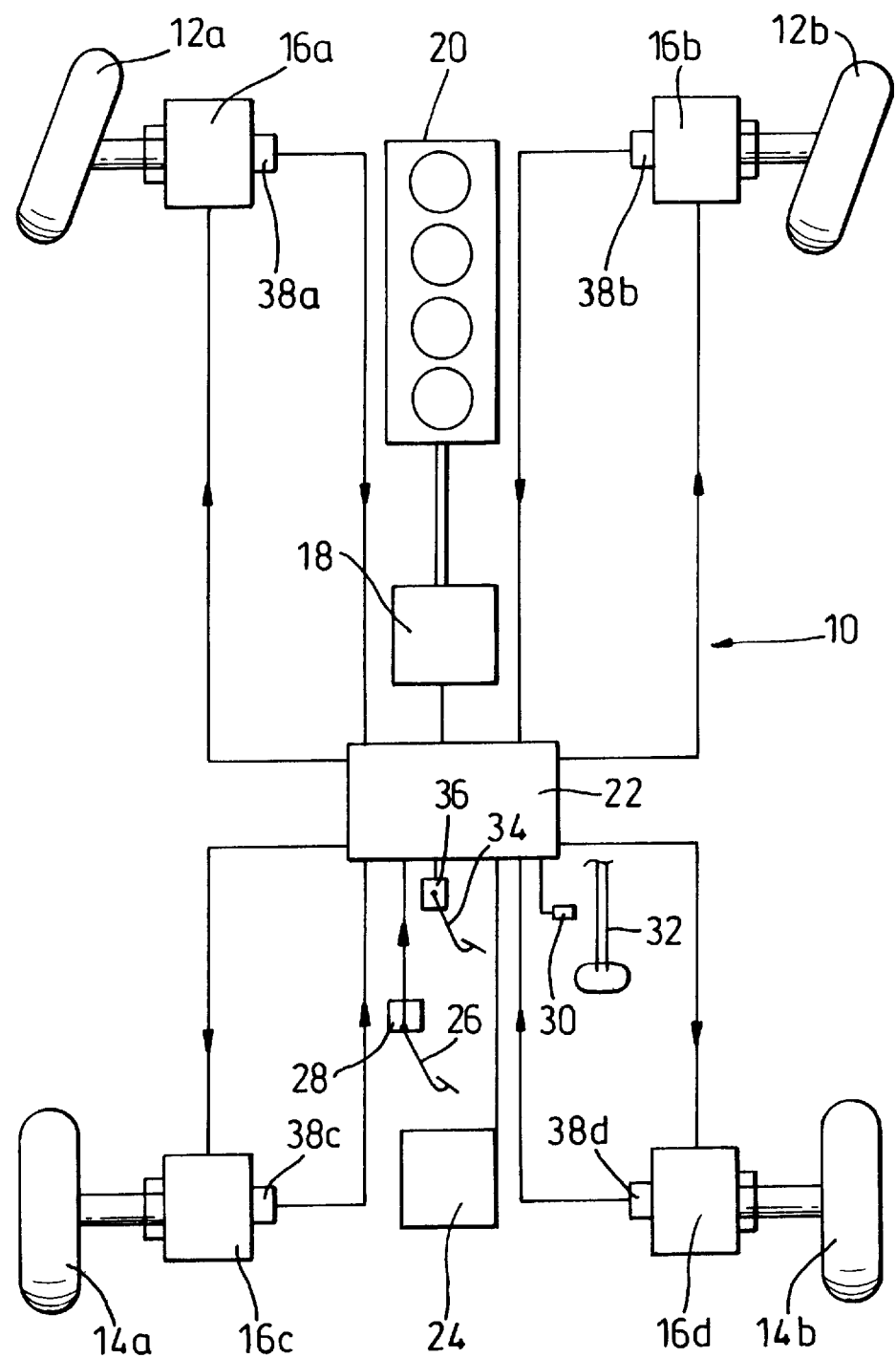
FIG. 2 is a diagram showing the components of velocity of a vehicle.

Referring to FIG. 2 a vehicle 10 has a steerable front pair of wheels 12a, 12b and a non-steerable rear pair of wheels 14a, 14b. Each of the wheels 12, 14 is driven by an independent electric motor 16a, 16b, 16c, 16d, The power for the motors 16 is derived via a generator 18 from an internal combustion engine 20 and distributed in the desired proportions to the motors 16 by a control unit 22. The polarity of the power supply to each of the motors can be reversed by the control unit 22 so each motor can apply a braking torque as well as a driving torque to its respective wheel 12, 14. The direction and magnitude of the torque supplied to each wheel is therefore controllable independently. A battery 24 is also provided to act as a buffer for the storage of excess energy produced and to smooth over irregularities in the power of the engine 20. An accelerator pedal 26 has a potentiometer 28 connected to it which produces a torque demand signal dependent on the pedal position and inputs it to the control unit 22. A steering angle sensor 30 senses the rotational position of the steering shaft 32 in the vehicle steering column and provides a steering angle signal to the control unit 22 indicative of the steering angle of the front wheels 12a, 12b. A brake pedal 34 is also provided with a potentiometer 36 connected to it which produces a brake demand signal, dependent on the brake pedal position, which is input to the control unit 22.

A wheel speed sensor 38a, 38b, 38c, 38d is attached to each of the motors 16 and produces a wheel speed signal dependent on the speed of the respective wheel which is input to the control unit. From these signals the control unit 22 can determine the speed of rotation of each of the wheels. It can also make an estimation of the ground speed of the vehicle by combining all of the wheel speed signals. In order to provide a more accurate measure of the speed and direction of travel of the vehicle, information from accelerometers on the vehicle body and satellite navigation systems can be combined with the wheel speed information.

Under normal driving conditions, if the driver has depressed the accelerator 26 to request a driving torque, the control unit 22 supplies power in equal proportions to all of the motors 16 to produce the torque specified by the torque demand signal. If the vehicle is in motion and the driver has not depressed the accelerator 26 to demand a driving torque, the control unit 22 will instruct the motors 16 to deliver a regenerative braking torque. This torque is proportional to the vehicle's speed and mimics the overrun torque experienced with a conventional vehicle. If the driver depresses the brake pedal 34 the braking torque produced by the motors 16 will increase. Normally a conventional braking system, for example using disk brakes, will be required in parallel with the regenerative braking to produce sufficient braking torque if the braking demand is above a certain level.

Figure 3:
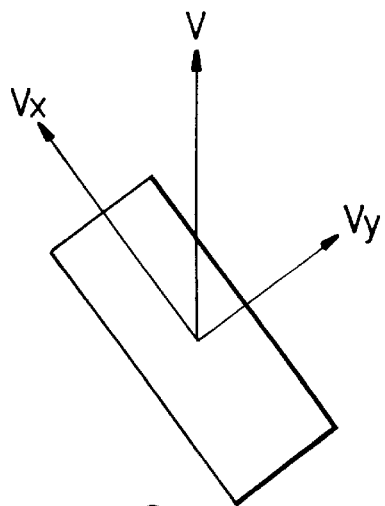
FIG. 3 is a diagrammatic representation of a vehicle including a drive system according to the invention.

The control unit continuously monitors the torque at each wheel, the speed of each wheel, and the steering angle, and the estimated ground speed of the vehicle, and determines the amount of wheel slip of each of the wheels. Referring to FIG. 3, in order to describe the vehicle's motion fully the component of the vehicles velocity V in the direction of the longitudinal axis of the vehicle $V_x$, and the component $V_y$ in the direction of its lateral axis are calculated, and preferably the yaw rate, i.e. the rate of rotation about a vertical axis through the centre of the vehicle, is also calculated. From this information and the steering angle, the control unit can determine the speed and direction of movement of each of the wheels over the ground, and comparing this with the wheels speeds gives the slip rate of each of the wheels. The control unit then controls the tractive or braking torque at the wheels thereby controlling the wheel slip so as to optimize the braking, acceleration and steering to suit the driver's demands as described below.

Figure 4:
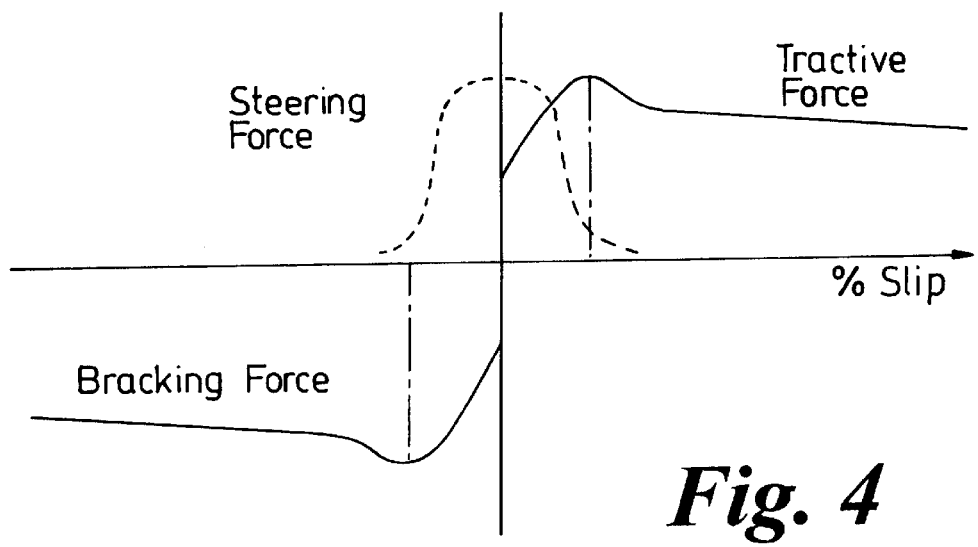
FIG. 4 is a diagram showing the tractive and steering forces available from a tire as a function of wheel slip.

Referring to FIG. 4, steering (lateral) and tractive and braking (longitudinal) forces vary as a function of the wheel slip. The maximum steering force is greatest at zero slip and falls off symmetrically as positive or negative slip increases. The maximum tractive and braking forces available have a fixed value while there is no wheel slip. Then for low amounts of wheel slip the maximum tractive force increases with increasing positive wheel slip (where the wheel's rotational speed is higher than the wheel's ground speed) up to an absolute maximum, beyond which it decreases again with increasing positive wheel slip, and the maximum braking force increases with increasing negative wheel slip (where the wheel's rotational speed is lower than the wheel's ground speed) up to an absolute maximum, beyond which it decreases again with increasing negative wheel slip. Therefore the maximum steering force, the maximum tractive force and the maximum braking force all occur at different rates, of wheel slip, and the control unit is arranged to control the amount of wheel slip to a compromise slip rate according to the order of priority of steering and acceleration or braking control. Generally the slip rate will decrease towards zero with increasing steering angle, and increase to the optimum braking or accelerating slip with increasing demand for braking or accelerating torque.

Figure 5:
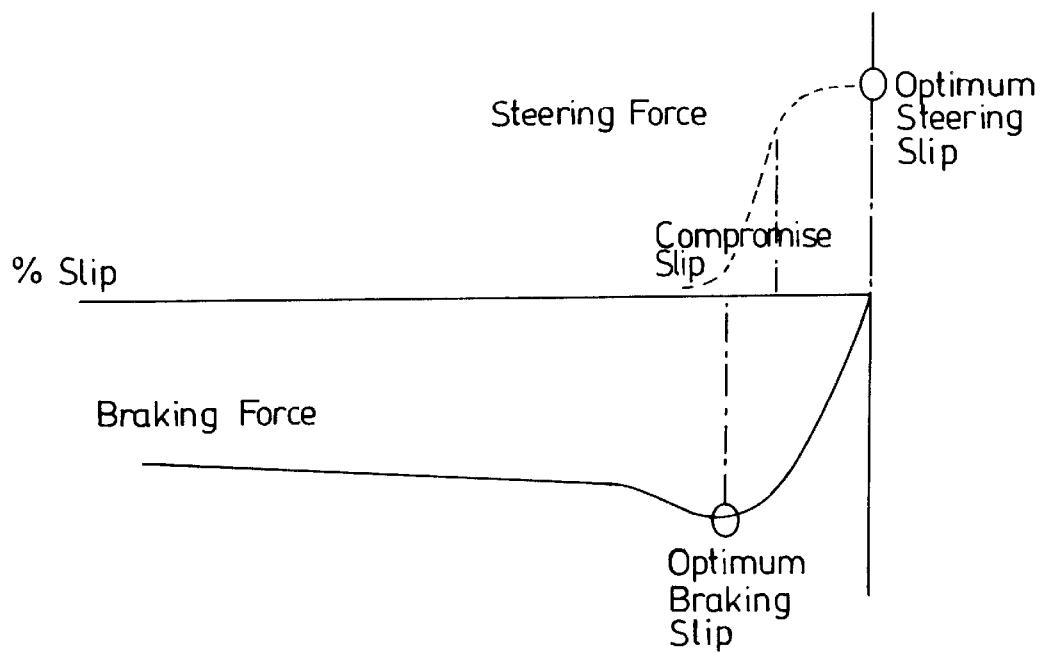
FIGS. 5 and 6 are diagrams showing how the control unit of the system of FIG. 4 controls the amount of wheel slip to achieve optimum steering and traction.

If while the motors 16 are applying a braking torque to the wheels 12a, 12b, and the steering angle is approximately zero, i.e, straight ahead, the control unit controls the braking torque so as to maintain the wheel slip at the optimum value for producing a braking torque, i.e. a fixed negative slip. If it determines that either of the front wheels 12a, 12b is slipping in the negative sense by more than this amount, i.e, is rotating more slowly than desired, the control unit reduces the braking torque to the slipping wheel or wheels until their speed of rotation reaches a desired wheel speed. However, referring to FIG. 5, as mentioned above, the desired wheel speed for the front wheels is also dependent on the steering angle of the front wheels 12a, 12b. Therefore, if the front wheels are at a high steering angle, then steering takes a higher priority over braking, and the optimum steering is obtained by setting the desired speed for the front wheels closer to their ground speed, but still below it if braking torque is still required. The compromise value or desired value of the wheel slip therefore decreases towards zero.

Figure 6:
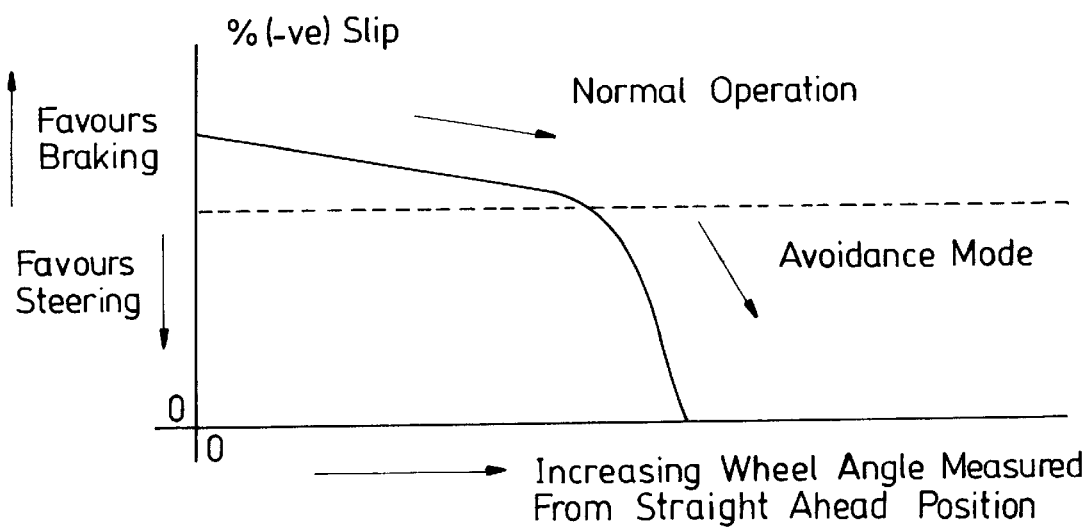

FIG. 6 shows how the wheel slip is controlled in response to changes in steering angle for a high friction surface when a braking torque is required at the wheels. For low steering angles, up to a first angle a, the control unit is arranged to reduce the slip gradually with increasing steering angle, at steering angles greater than a, the system enters an avoidance mode in which steering is given a higher priority and the slip rate is decreased more rapidly towards zero with increasing steering angle.

In some circumstances where steering control is in danger of being completely lost, it may be necessary for the control unit 22 to apply a positive tractive torque to the wheels for them to reach the desired speed to provide steering, even when the driver is not giving a demand for acceleration of the vehicle. This would occur, for example, if the wheel speed were still below the desired wheel speed even with its brakes released. This is particularly likely to occur when the steering angle is large and the forward motion of the vehicle is less able to cause rotation of the front wheels. In order to compensate for this, the control unit applies a braking torque, or increases the braking torque, to the rear wheels 14a, 14b, provided they have sufficient grip, to compensate for the increased driving torque supplied to the front wheels 12a, 12b.

If an accelerating torque is required, then the system controls the wheel slip between zero, for maximum steering capability, and a certain positive slip rate which gives maximum traction, depending on the level of acceleration requested by the driver and the steering angle, i.e. the relative priorities of steering and acceleration.

The relationship between the desired slip rate and the braking or acceleration demand and steering angle, will vary with the coefficient of friction of the surface on which the vehicle is travelling. This is because the slip rates required to give optimum braking and acceleration vary with the nature of the surface. Therefore the shape of the curves of steering and tractive and braking forces as functions of wheel slip, shown in FIG. 4, will vary depending on the type of surface, and the optimum compromise slip rate for a given set of circumstances will vary accordingly. The control unit therefore uses an assessment of the type of surface to derive the desired value of wheel slip.

The type of surface is determined by measuring the changes in wheel speed produced by known changes in torque supplied to the wheels. These measurements give an indication of the levels of friction and stiction between the wheels and the surface. The control unit then uses fuzzy logic to characterize the terrain in general terms such as "very slippery", "a bit slippery" or "grippy". As an alternative to this it can approximate the surface to various known surfaces such as tarmac, clay or ice. Also certain levels of traction may be achieved which preclude the terrain from being a surface such as ice. Depending on the method of characterization of the surface, the control unit will use either pre-set slip numbers, pre-stored slip curves, of a slip algorithm to determine the optimum slip from the inputs of desired acceleration, braking, and steering angle and the nature of the surface.

What is claimed is:

1. A drive system for a vehicle having a steerable wheel, the system comprising wheel slip measuring means for measuring a negative slip rate of said steerable wheel, drive means for driving said steerable wheel, and control means arranged to receive signals from said wheel slip measuring means, and to control the drive means to increase the driving torque to the steerable wheel if the negative slip rate of the steerable wheel is greater than a desired negative slip rate, wherein the system includes two steerable wheels and drive means for measuring the negative slip rate is arranged to independent drive, each of said steerable wheels, the wheel slip measuring means being arranged to measure a negative slip rate of each of said steerable wheels, and the control means being arranged to increase the drive to either of said steerable wheels if its negative slip rate is greater than said desired negative slip rate.

2. A system according to claim 1 wherein the control means is arranged to increase the wheel speed of a slipping steerable wheel to reach said desired slip rate.

3. A system according to claim 1 wherein the control means is arranged to determine the nature of the surface over which the vehicle is travelling, and the desired slip rate is dependent on the nature of said surface.

4. A system according to claim 1 wherein the control system is arranged when the vehicle is travelling over a surface, to determine the level of friction between at last one wheel of the vehicle and said surface, and said desired slip rate is dependent on said level of friction.

5. A system according to claim 1 further comprising wheel braking means for another wheel of the vehicle, wherein the control means is arranged to apply the wheel braking means to said other wheel of the vehicle to compensate for the increased driving torque supplied to the steerable wheel.

6. A system according to claim 5 wherein said other wheel is a non-steerable wheel.

7. A system according to claim 1 further comprising a steering angle sensing means for sensing the steering angle of said steerable wheel, wherein said desired slip rate is dependent on said steering angle.

8. A system according to claim 1 wherein, when the vehicle is travelling over a surface, the control means is arranged to determined the nature of said surface and the desired slip rate is also dependent on the nature of said surface.

9. A system according to claim 8 wherein, when the vehicle is travelling over a surface, the control means is arranged to determine the nature of said surface by measuring changes in wheel speed produced by known changes in torque supplied to said wheel.

10. A drive system for a vehicle having a steerable wheel, the system comprising steering angle measuring means for measuring the steering angle of said steerable wheel, wheel slip measuring means for measuring the slip rate of said steerable wheel, torque demand means for indicating a demand for torque from a driver of the vehicle, and torque control means arranged to monitor the slip rate measured by the wheel slip measuring means and to control the torque supplied to said steerable wheel thereby to control said slip rate to a desired slip rate, wherein the desired slip rate is dependent on the torque demand and the steering angle.

11. A system according to claim 10 wherein, when a demand for torque is present, the desired slip rate decreases with increasing steering angle.

12. A system according to claim 10 wherein, when a demand for driving torque is present the desired slip rate is a positive slip rate, and when a demand for braking torque is present the desired slip rate is a negative slip rate.

13. A system according to claim 10 wherein, for a non-zero steering angle, the desired slip rate increases with increasing demand for torque.

14. A drive system according to claim 10 wherein, when the vehicle is traveling over a surface, the control means is arranged to determine the nature of said surface and the desired slip rate is also dependent on the nature of said surface.

15. A drive system according to claim 14 wherein, when the vehicle is traveling over a surface, the control means is arranged to determine the nature of said surface by measuring changes in wheel speed produced by known changes in torque supplied to said wheel.

* * * * *